United States Patent
Wu et al.

[11] Patent Number: 6,141,183
[45] Date of Patent: Oct. 31, 2000

[54] PROCESS FOR PRODUCING A POLE-TRIMMED WRITER IN A MAGNETORESISTIVE READ/WRITE HEAD AND A DATA TRANSDUCER MADE THEREBY

[75] Inventors: Andrew L. Wu, Shrewsbury; Paul Duval, Lexington; Thomas Ferraguto, Woburn, all of Mass.

[73] Assignee: Matsushita-Kotobukie Electronics Industries, Ltd., Saijo, Japan

[21] Appl. No.: 09/115,147

[22] Filed: Jul. 14, 1998

Related U.S. Application Data

[62] Division of application No. 08/791,401, Jan. 30, 1997, Pat. No. 5,804,085.

[51] Int. Cl.[7] .................................................. G11B 5/39
[52] U.S. Cl. ................................................... 360/126
[58] Field of Search ................................ 216/22, 39, 49, 216/66, 100; 204/192.34; 29/603.13, 603.14, 603.15; 360/113, 126

[56] References Cited

U.S. PATENT DOCUMENTS

| | | | |
|---|---|---|---|
| 4,436,593 | 3/1984 | Osborne et al. ................... | 204/15 |
| 4,853,080 | 8/1989 | Anthony ............................. | 216/22 |
| 4,992,901 | 2/1991 | Keel et al. ......................... | 306/110 |
| 5,141,623 | 8/1992 | Cohen et al. ...................... | 205/122 |
| 5,264,981 | 11/1993 | Campbell et al. ................ | 360/126 |
| 5,315,469 | 5/1994 | McNeil ............................. | 360/119 |
| 5,349,745 | 9/1994 | Kawaba et al. ................... | 29/603.18 |
| 5,379,172 | 1/1995 | Liao ................................. | 360/126 |
| 5,438,747 | 8/1995 | Krounbi et al. .................. | 29/603 |
| 5,485,334 | 1/1996 | Nix et al. ......................... | 360/113 |
| 5,493,464 | 2/1996 | Koshikawa ....................... | 360/113 |
| 5,532,892 | 7/1996 | Nix et al. ......................... | 360/113 |
| 5,573,809 | 11/1996 | Nix et al. ....................... | 427/123 |
| 5,578,342 | 11/1996 | Tran et al. ....................... | 427/131 |
| 5,633,771 | 5/1997 | Yoda et al. ...................... | 306/121 |
| 5,658,469 | 8/1997 | Jennison .......................... | 216/22 |
| 5,867,890 | 2/1999 | Hsiao et al. ..................... | 216/22 |
| 5,874,010 | 2/1999 | Tao et al. ........................ | 216/22 |
| 5,916,423 | 6/1999 | Westwood ....................... | 216/22 |
| 5,945,007 | 8/1999 | Cohen .............................. | 216/22 |

OTHER PUBLICATIONS

*Magnetoresistive (MR) Head Technology*; A Quantum White Paper; 1996–Quantum Corporation.

*Primary Examiner*—Randy Gulakowski
*Assistant Examiner*—Anita Alanko
*Attorney, Agent, or Firm*—Hogan & Hartson LLP

[57] ABSTRACT

A pole-trimmed writer for an MR read/write data transducer which may be produced without significant re-deposition of $Al_2O_3$ or NiFe on the sides of the writer poles. The process disclosed herein advantageously provides an upper (top) pole which is processed to project a pair of relatively thin, laterally extending lower flanges, prior to the use of the upper pole as a mask to subsequent ion milling of the lower pole, or shared shield. In a preferred embodiment, the process for producing the flange is implemented in conjunction with the deposition of a single copper (Cu) or dual $Al_2O_3$ and chromium (Cr) overlayers formed on the upper pole seed layer followed by the top pole formation and selective removal of a predetermined amount of the underlying portions of the gap material prior to a subsequent ion milling operation and further processing of the read/write head.

22 Claims, 4 Drawing Sheets

PROCESS FOR PRODUCING A POLE-TRIMMED WRITER IN A MAGNETORESISTIVE READ/WRITE HEAD AND A DATA TRANSDUCER MADE THEREBY

This application is a divisional of prior application Ser. No. 08/791,401 filed on Jan. 30, 1997, now U.S. Pat. No. 5,804,085 entitled "PROCESS FOR PRODUCING A POLE-TRIMMED WRITER IN A MAGNETORESISTIVE READ/WRITE HEAD AND A DATA TRANSDUCER MADE THEREBY", which is hereby incorporated by reference in its entirety.

CROSS REFERENCE TO RELATED APPLICATIONS

The present invention is related to the subject matter of U.S. Pat. No. : 5,485,334 issued Jan. 16, 1996 for "Magnetoresistive Device and Method Having Improved Barkhausen Noise Suppression"; U.S. Pat. No. 5,532,892 issued Jul. 2, 1996 for "Soft Adjacent Layer Biased Magnetoresistive Device Incorporating a Natural Flux Closure Design Utilizing Coplanar Permanent Magnet Thin Film Stabilization"; and U.S. Pat. No. 5,573,809 issued Nov. 12, 1996 for "Process for Forming a Magnetoresistive Device". The foregoing United States Patents are assigned to Quantum Peripherals Colorado, Inc., Louisville, Colo. and the disclosures thereof are hereby specifically incorporated herein by this reference. The present invention is also related to the subject tryatter disclosed in U.S. patent application Ser. Nos.: 08/461,411 filed Jun. 5, 1995 now abandoned and 08/681,042 filed Jul. 22, 1996 now U.S. Pat. No. 5,638,509 for "Flux Enhanced Write Transducer and Process for Producing the Same in Conjunction with Shared Shields on Magnetoresistive Read Heads" Ser. No. and 08/550,872 filed Oct. 31, 1995 now U.S. Pat. No. 5,734,531 for Magneto-Resistive Read/Write Head", all likewise assigned to Quantum Peripherals Colorado, Inc.

BACKGROUND OF THE INVENTION

The present invention relates, in general, to the field of magnetic data transducers and methods for producing the same. More particularly, the present invention relates to a process for producing a pole-trimmed writer in a magnetoresistive ("MR") read/write head, and a data transducer produced thereby, of especial utility in conjunction with shared, or merged, shields on magnetoresistive read heads.

Magnetoresistive heads, or sensors, are known to be useful in reading data from a magnetic surface with a sensitivity exceeding that of inductive or other thin film heads. In operation, an MR sensor is used to detect magnetic field signal changes from a magnetic surface due to the fact that the resistance of the MR sensor changes as a function of the direction and amount of magnetic flux being sensed.

Currently, the magnetic field signal changes encoded on the magnetically hard surface of a computer mass storage medium which are to be "read" by an MR read head are "written" by an associated write head, or writer. In those instances when the MR read head has associated shield layers, as described in the aforementioned patents and patent applications for example, the write head may utilize the top shield as a bottom pole producing what is known as a merged, or shared shield/pole structure.

In these combined read/write data transducer structures, it has been shown that the area of greatest magnetic flux in the shared shield/pole may move around within that layer from the area immediately beneath the upper pole of the write head adjacent the intermediate dielectric gap layer. In parametric terms, the write track may "wander" and fringe fields might result wherein a write operation may actually take place toward the side of a given track that might then erroneously be read as data from the adjacent track. Reduction of track wander and associated fringe fields is increasingly important as track spacing is decreased in an attempt to increase the areal density of a magnetic computer mass storage device.

As a consequence, it has previously been proposed to remove portions of the upper surface of the shared shield/pole surrounding the upper pole and gap layer by, for example, "notching" or "pole-trimming" the shield/pole by ion milling (using the upper pole as a mask), to reduce its width to an area equivalent to the upper pole to better confine the flux to the desired region. However, due to the fact that the shield may have to be milled down on the order of about a micron ("$\mu$") or more to effectuate the desired flux constraint, a typical ion milling operation could conceivably take on the order of 60 minutes or longer of device processing time. This protracted ion milling of the shared shield/pole and upper pole surface may result in potentially damaging heat build up in the device structure during the process and it has been found that the resultant slope of the surface achieved in this manner may be, for the most part, too long and therefore ineffective in confining the magnetic flux as needed.

Moreover, due to removal of this relatively large amount of shield, pole and gap layer material during the milling process, a significant amount of it will subsequently get re-deposited throughout the processing system and ultimately build up on the sides of the upper pole, the gap material and the lower "trimmed" pole further degrading device function. Build up of thickness of approximately one half of the thickness of the ion milled gap, shield and pole material has been typically observed. This is particularly true in the case of merged shield elements used in conjunction with MR read heads wherein the lower pole/shield is substantially wider than the top pole (on the order of 30 times wider) thus exposing much more material to the ion milling process and, therefore, resulting in the unacceptable re-deposition of materials noted previously, in particular the metallic shield material. In conventional inductive thin-film heads, this same ion milling operation is generally much less of a problem in terms of undesired re-deposition due to the fact that the lower pole is generally only on the order of 1.5 $\mu$m wider than the top pole in the first instance, thereby exposing less metallic material to ion milling.

SUMMARY OF THE INVENTION

The process of the present invention is of especial utility in the provision of a pole-trimmed writer for an MR read/write data transducer which may be produced without significant re-deposition of alumina ($Al_2O_3$) gap or nickel iron (NiFe) pole material on the sides of the upper and lower writer poles, in particular in the vicinity of the write gap. The process disclosed herein advantageously provides an upper pole which is processed to project a pair of relatively thin, laterally extending lower flanges, prior to the use of the upper pole as a mask to subsequent ion milling of the lower pole on the shared shield. In a preferred embodiment, the process for producing the flanges is implemented in conjunction with the deposition of a single copper (Cu) or dual $Al_2O_3$ and chromium (Cr) overlayers formed on the upper (or top) pole seed layer followed by upper pole formation and selective removal of a predetermined amount of the underlying portions of the gap material prior to subsequent ion milling and processing of the read/write head.

The substantial elimination of undesired $Al_2O_3$/NiFe re-deposition along the sides of the upper and lower trimmed writer poles is critical to achieving consistently reliable functionality of an MR read/write head. In a particular embodiment, the process disclosed herein utilizes the deposition and patterning of either a single or dual overlayer structure prior to the upper pole plating process followed by a write gap wet etch step and a pole trimming operation utilizing ion milling to virtually eliminate any re-deposition of the ion milled materials on the pole sides.

Particularly disclosed herein is a process for forming a write head which includes a lower pole element and an overlying gap layer. The process includes the step of forming an upper pole of the write head overlying the gap layer, with the upper pole presenting a pair of laterally extending flanges adjoining the gap layer. Portions of the upper pole are removed along with the laterally extending flanges and a predetermined portion of an upper surface of the lower pole element to produce a lower pole of a width substantially equal to that of the upper pole.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
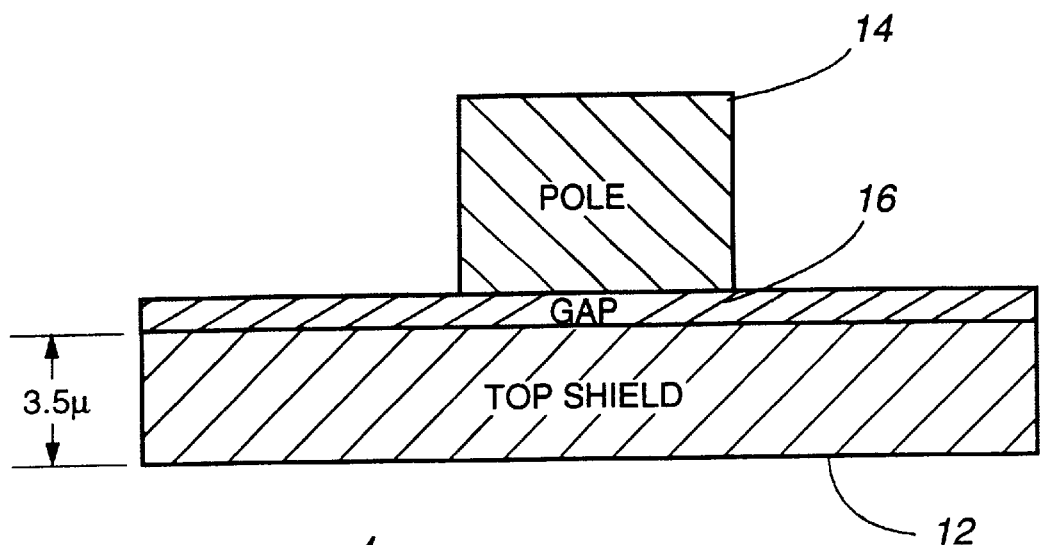
FIG. 1A is a simplified, cross sectional, air bearing surface ("ABS") view of the write portion of a prior art data transducer which utilizes a shared, or merged, shield for an MR read sensor as one pole thereof wherein the area of greatest flux within the shared shield/pole is able to move around within the shield from a position generally beneath the upper pole thereof.

With reference now to FIG. 1A, a prior art write head 10 is shown. The prior art write head 10 comprises, in pertinent part, a top shield 12 which functions as a bottom pole element for the write head 10 portion of a data transducer incorporating a read head (not shown) interposed between a lower shield (not shown) and the top shield 12. The top shield 12 may comprise nickel iron (NiFe) or other suitable magnetically permeable material.

The prior art write head 10 further comprises an upper pole 14, which may also comprise NiFe, separated from the top shield 12 by means of a gap layer 16. The gap layer 16 may comprise alumina ($Al_2O_3$) or other similar dielectric material.

With reference to the prior art write head 10 shown, it has been found that the magnetic flux in the top shield 12 may wander unpredictably throughout the structure thereof resulting in undesired fringe fields that might possibly result in data being written to the sides of a desired track centerline such that spurious signals may be read on adjacent tracks.

Figure 1B:
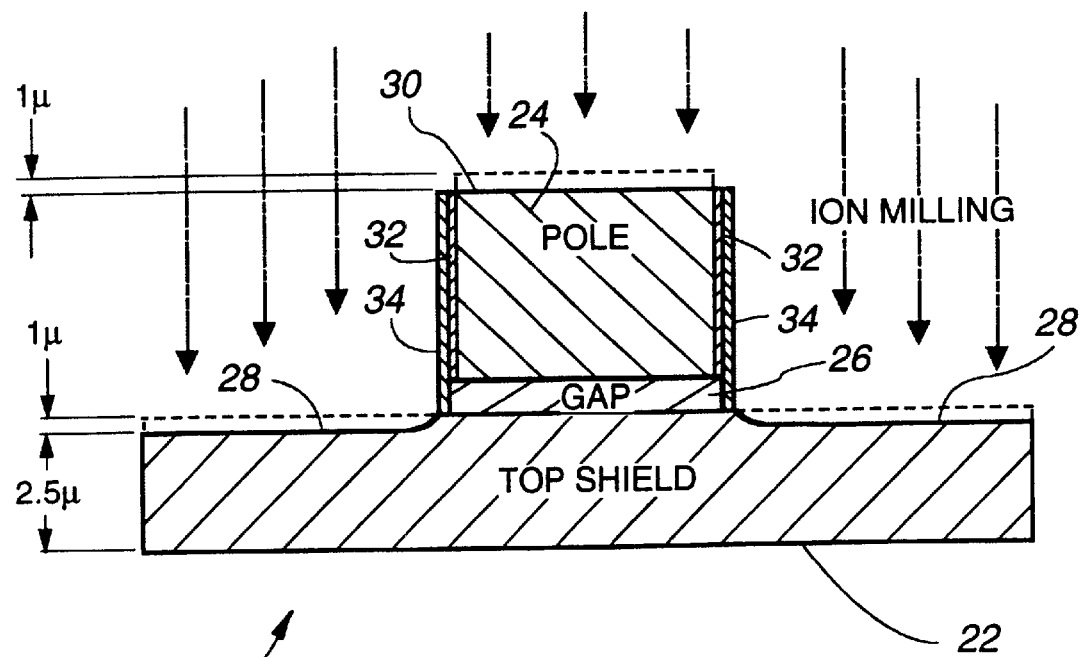
FIG. 1B is a follow-on ABS view of the prior art data transducer of FIG. 1A illustrating the removal of portions of the upper surface of the shared shield/pole (to produce a "trimmed" pole) as well as portions of the surface of the upper pole and gap layer by an ion milling operation in order to attempt to preclude the movement of the flux within the shared shield/pole layer to an area substantially underlying the upper pole and in which a significant amount of the gap and shield material is unintentionally re-deposited on the sides of the upper pole while the lengthy ion milling operation is conducted.

To this end, it has been proposed as shown in FIG. 1B, to alter the structure of the prior art write head 10 to that of the prior art write head 20 by means of, for example, an ion milling operation to "notch" or "pole-trim" the device structure in an attempt to constrain the magnetic flux to a desired location substantially co-extensive with an upper pole 24. Prior art write head 20 includes a top shield 22, corresponding upper pole 24 and intermediate gap layer 26 in a manner similar to the prior art write head 10 shown in FIG. 1A.

By means of an ion milling operation, the prior art write head 10 shown in FIG. 1A may be altered to the configuration of the prior art write head 20 shown in FIG. 1B wherein one micron of the top shield 22 upper surface 28 is removed surrounding the upper pole 24 using it as a milling mask. For example, if the top shield 12 of prior art write head 10 is ion milled whereby one micron (1 $\mu$) of the shield upper surface 28 is removed, the top shield 22 will have a resultant thickness of 2.5 microns at the extremities thereof. In like manner, the ion milling operation also removes 1 $\mu$ from the pole upper surface 30 of the upper pole 24.

The ability to effectively constrain the magnetic flux within the top shield 22 has been shown to be a function of the amount of material removed from the shield upper surface 28 in the area surrounding the upper pole 24, tapering to the area directly beneath it. Removal of 1 $\mu$ of the shield material has been found to take on the order of 50 minutes of ion milling which, in addition to the rather long processing step it presents, also results in an undesirable build up of heat within the prior art write head 20 and associated data transducer structure which may possibly result in device failure. Moreover, the slope imparted to the shield upper surface 28 by the ion milling operation adjacent the upper pole 24 is relatively long and the flux containment thereby imparted is not as effective as might be desired.

Significantly, the material removed from the shield upper surface 28 and the gap layer 26 is undesirably re-deposited on the sides of the upper pole 24 as well. In this regard, the upper pole 24 then presents re-deposited gap material 32 as well as re-deposited shield material 34. This re-deposited material alters the characteristics of the write head 20 and can significantly impact its effectiveness as a data write transducer. It has been found that approximately one-half of the thickness of the material removed from the top shield 22 and gap layer 26 ultimately gets re-deposited on the sides of the pole 24.

Figure 2A:
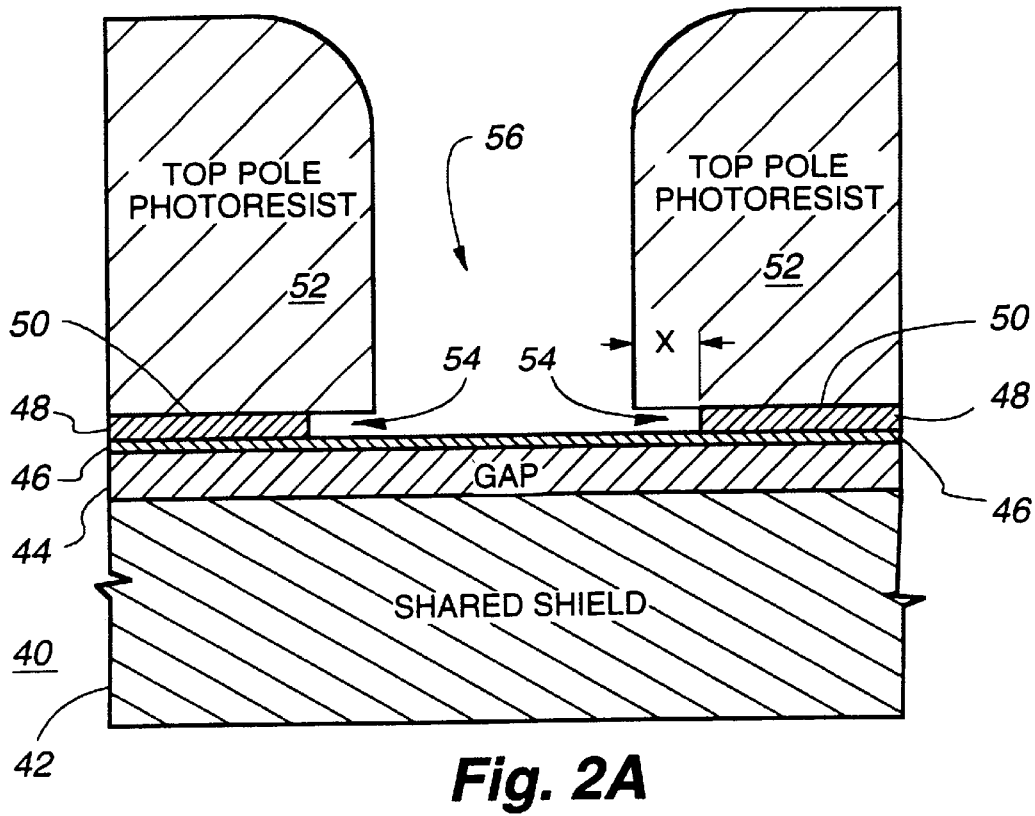
FIG. 2A is a partial ABS view of a particular embodiment of a process flow in accordance with the present invention illustrating a lower pole/shared shield for an MR read/write head including a gap layer, upper (or top) pole seed layer and a dual layer of $Al_2O_3$ and Cr utilized in conjunction with subsequent processing steps to form a top pole having a pair of relatively thin, laterally extending lower flanges.

With reference now to FIG. 2A, a particular embodiment of a process 40 in accordance with the present invention is shown. The process 40, which is utilized in conjunction with other processing steps to produce an MR read sensor in conjunction with a writer having a shared (or merged) shield 42, includes the step of depositing a write gap layer 44 of alumina ($Al_2O_3$) on the shield 42 to a thickness of substantially 4000 Å. A seed layer 46 of substantially 1000 Å of NiFe is then deposited overlying the gap layer 44 upon which the upper (or top) pole will thereafter be formed.

The process 40 of the present invention then comprises the step of depositing an overlayer 48 of substantially between 2500 Å–3500 Å of $Al_2O_3$ on top of the seed layer 46. Thereafter, an additional overlayer 50 of substantially between 100 Å–200 Å of Chromium (Cr) is deposited overlying the $Al_2O_3$ overlayer 48 forming a dual layer structure. At this point, the top pole photoresist 52 is patterned and the thin Cr overlayer 50 is removed, by etching, in the region where the upper pole is to be formed. Following the removal of this portion of the Cr overlayer 50, the underlying portion of the $Al_2O_3$ overlayer 48 is also removed to produce a re-entrant profile 54 of depth "x" in communication with the void 56 surrounded by the photoresist 52 into which the upper pole will ultimately be formed. In a preferred embodiment, the depth "x" is on the order of 0.5 microns. The presence of the Cr layer provides better control of the $Al_2O_3$ undercut, that is, the depth "x".

Figure 2B:
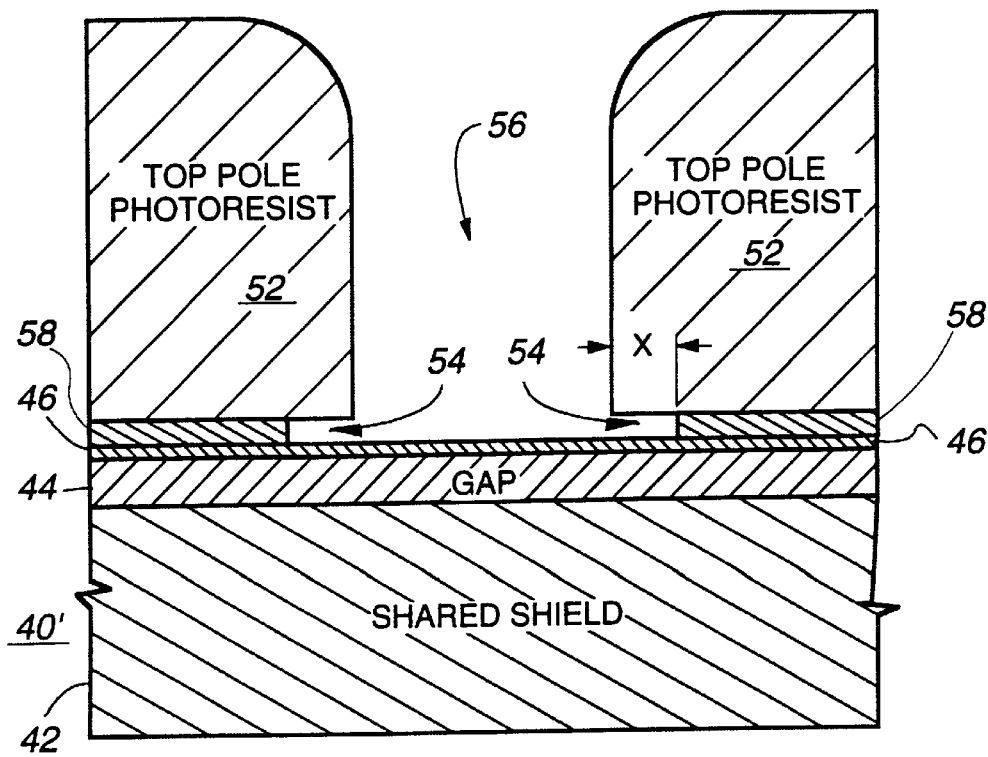
FIG. 2B is an additional, partial ABS view of an alternative embodiment of a process flow of the present invention which substantially simplifies subsequent MR read/write head processing by substitution of a single Cu layer for the dual $Al_2O_3$ and Cr layers illustrated in FIG. 2A.

With reference additionally now to FIG. 2B, an alternative embodiment of a process $40^1$ in accordance with the present invention is shown. The process $40^1$, which is utilized in conjunction with other processing steps to produce an MR read sensor in conjunction with a writer having a shared shield 42, includes a similar step of depositing a write gap layer 44 of $Al_2O_3$ on the shield 42 to a thickness of substantially 4000 Å. A similar seed layer 46 of substantially 1000 Å of NiFe is then deposited overlying the gap layer 44 upon which the upper pole will thereafter be formed.

The process 401 then comprises the step of depositing a single overlayer 58 of substantially between 2500 Å–3500 Å of copper (Cu) on top of the seed layer 46. At this point, the top pole photoresist 52 is patterned as before and the Cu overlayer 58 is removed in the region where the upper pole is to be formed in conjunction with a similar lateral removal underlying the photoresist 52 to produce re-entrant profiles 54 also of depth "x" in communication with the void 56 surrounded by the photoresist 52 into which the upper pole will ultimately be formed. The primary advantage of process $40^1$ (FIG. 2B) over process 40 (FIG. 2A) is that the NiFe and Cu processing steps may be conveniently undertaken within the same processing system. In contrast, the process 40 requires that the NiFe be processed in a first system and then the materials transferred to a second system for the $Al_2O_3$ deposition and then back to the first system for the Cr deposition.

Figure 3A:
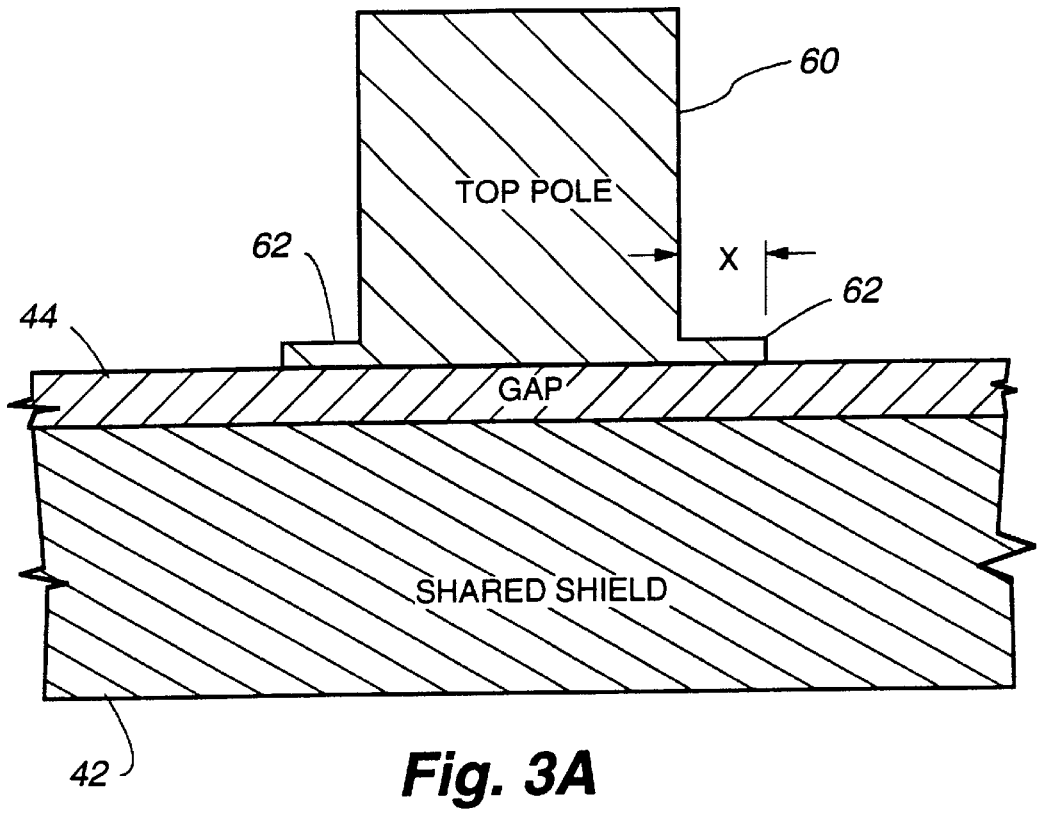
FIG. 3A is a follow-on view of the processes illustrated in FIGS. 2A and 2B showing a write head ("writer") formed in accordance with the process of the present invention wherein a pair of relatively thin, laterally extending lower flanges of width "x" is formed adjoining the gap layer.

With reference additionally now to FIG. 3A, the processes 40 (FIG. 2A) and $40^1$ (FIG. 2B) are further carried out as illustrated. That is, the top (upper) pole 60 is plated onto the seed layer 46, the photoresist 52 is stripped away, the dual $Al_2O_3$/Cr overlayers 48, 50 (FIG. 2A) or the single Cu overlayer 58 (FIG. 2B) is removed in addition to an ion milling of the seed layer 46 surrounding the top pole 60. The resultant top pole 60 then incorporates a pair of laterally extending lower flanges 62 adjoining the gap layer 44. The flanges 62 have a width "x" substantially equal to the re-entrant profile 54 of the preceding figures.

Figure 3B:
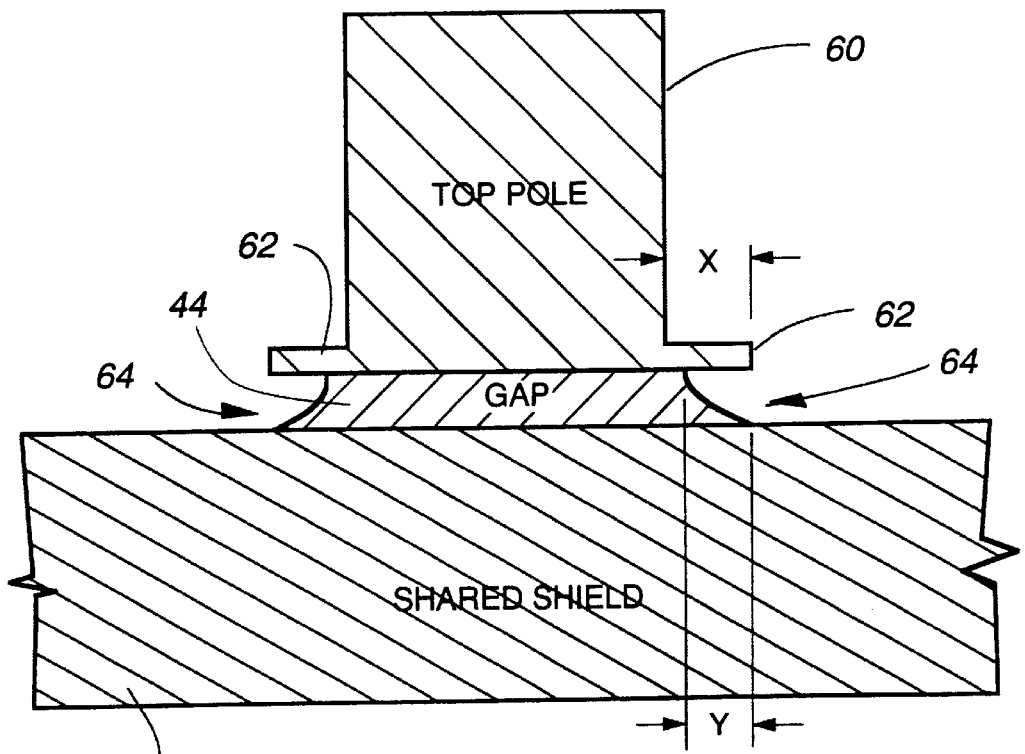
FIG. 3B is a further, follow-on view of the process illustrated in the preceding FIG. 3A wherein a re-entrant undercut of depth "y" is formed in the gap material substantially underlying the flanges formed in the upper pole.

With reference additionally now to FIG. 3B, at this point, the gap layer 44 in the region of the write gap is wet etched to produce re-entrant profiles 64 of depth "y" in the gap layer 44 substantially underlying the flanges 62. In practice, it is highly desired that the dimension "y" be equal to or smaller than the width "x" of the flanges 62. In a preferred embodiment, the dimension "y" will be substantially between 0.4 microns and 0.5 microns.

Figure 3C:
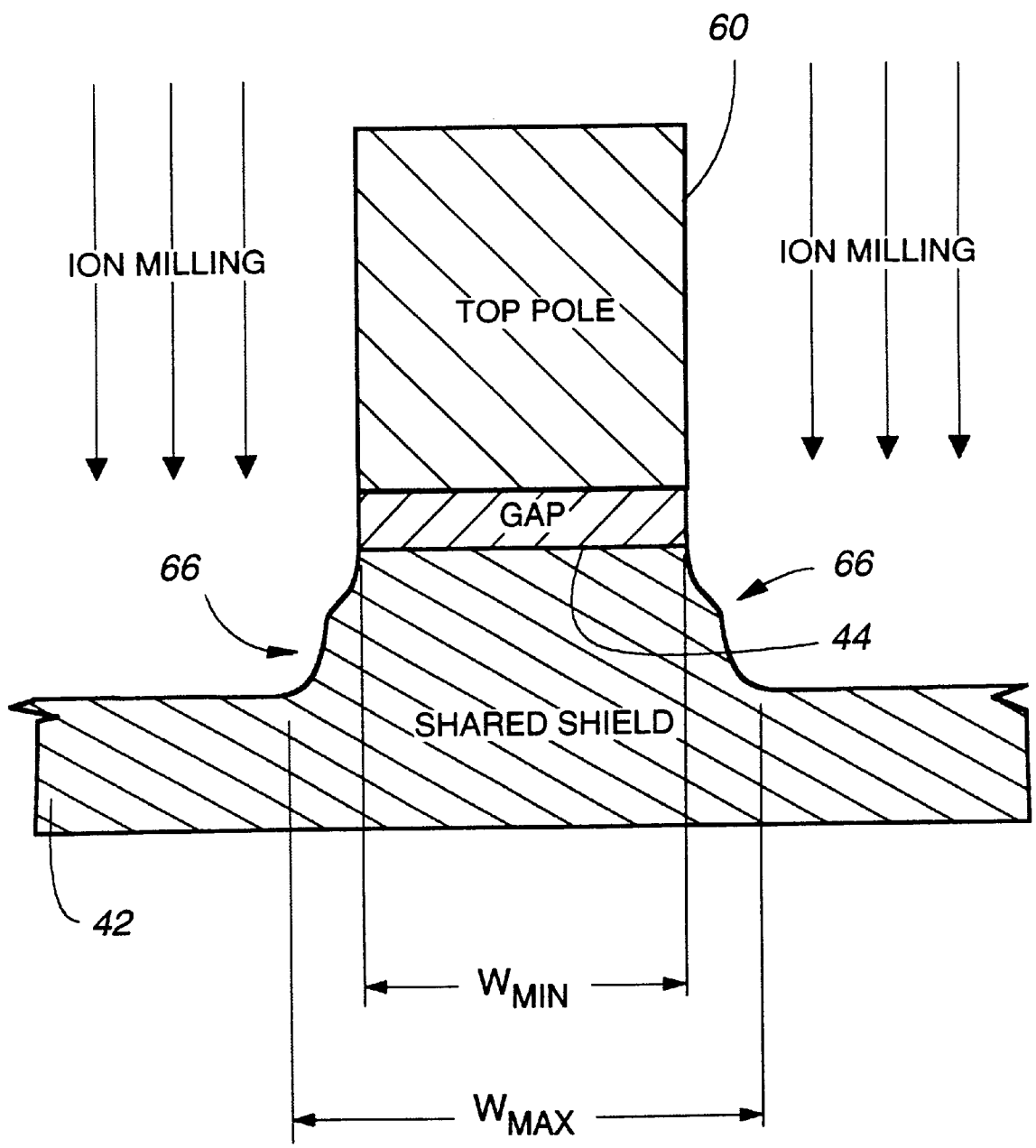
FIG. 3C is an additional, follow-on view of the writer of the preceding FIG. 3B following its subjection to a multi-direction ion milling operation to remove portions of the upper surface of the shared shield utilizing the upper pole as a mask and resulting in substantially no re-deposition of the $Al_2O_3$ gap or NiFe shield material on the sides of the upper pole.

With reference additionally now to FIG. 3C, multiple ion milling operations at various angles are then performed to trim the upper surface of the top pole 60, remove the flanges 62 as well as to remove portions of the upper surface of the shared shield 42 substantially surrounding the top pole 60 to produce radii 66 extending from the remaining gap layer 44 to the new upper surface of the shared shield 42. As the flanges 62 are removed, the ion milling of the shared shield 42 results in the formation of a mesa-like structure in the region of the write gap of substantially the same width as the top pole 60. As shown, the width of the shared shield 42 in the region of the write gap will vary from a width of $W_{MIN}$ to $W_{MAX}$ as the distance from the write gap increases. In a preferred embodiment, the widths $W_{MIN}$ and $W_{MAX}$ may be substantially between the width of the top pole 60 and 0.2 microns plus the width of the top pole 60.

Through the use of the process of the present invention above-disclosed, it can be seen that substantially no re-deposition of $Al_2O_3$ from the gap layer 44 or NiFe from the shared shield 42 will be redeposited on the sides of the top pole 60 or the radii 66 sides of the lower pole formed.

While there have been described above the principles of the present invention in conjunction with specific device structure, materials and manufacturing process flow it is to be clearly understood that the foregoing description is made only by way of example and not as a limitation to the scope of the invention. Particularly, it is recognized that the teachings of the foregoing disclosure will suggest other modifications to those persons skilled in the relevant art and that the materials and processing steps described by way of example may be modified to accommodate other electrolytic plating materials and processes. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A data transducer including a lower pole element and an overlying gap layer made by a process comprising the steps of:

forming an upper pole of said data transducer overlying said gap layer, said upper pole having a pair of laterally extending flanges adjoining said gap layer; and removing portions of said upper pole, said laterally extending flanges and a predetermined portion of an upper surface of said lower pole element to produce a lower pole of a width substantially equal to that of said upper pole.

2. The data transducer of claim 1 wherein said step of forming comprises the step of:

overlying said gap layer with a seed layer for said upper pole.

3. The data transducer of claim 2 wherein said step of overlying said gap layer with a seed layer comprises the step of:

depositing substantially 1000 Å of NiFe.

4. The data transducer of claim 2 further comprising the step of:

overlying said seed layer with an overlayer.

5. The data transducer of claim 4 wherein said step of overlying said seed layer with an overlayer comprises the step of:

depositing substantially 2500 Å–3500 Å of Cu.

6. The data transducer of claim 4 further comprising the step of:

additionally overlying said overlayer with an additional overlayer.

7. The data transducer of claim 6 wherein said step of overlying said seed layer with an overlayer comprises the step of:

depositing substantially 2500 Å–3500 Å of $Al_2O_3$.

8. The data transducer of claim 6 wherein said step of additionally overlying said overlayer with an additional overlayer comprises the step of:

depositing substantially 100 Å–200 Å of Cr.

9. The data transducer of claim 4 further comprising the step of:

defining said upper pole on said overlayer.

10. The data transducer of claim 9 wherein said step of defining is carried out by the step of:

patterning photoresist on said overlayer.

11. The data transducer of claim 10 further comprising the steps of:

removing a portion of said overlayer underlying said photoresist to define said laterally extending flanges.

12. The data transducer of claim 11 wherein said step of removing is carried out by the step of:

selectively etching said overlayer to create a pair of re-entrant profiles in said overlayer substantially corresponding to said pair of laterally extending flanges.

13. The data transducer of claim 11 further comprising the step of:

producing said upper pole and said pair of laterally extending flanges on said seed layer.

14. The data transducer of claim 13 wherein said step of producing is carried out by the step of:

plating said seed layer.

15. The data transducer of claim 10 further comprising the steps of:

removing said photoresist;

etching away remaining portions of said overlayer; and removing remaining portions of said seed layer from said gap layer.

16. The data transducer of claim 15 further comprising the step of:

selectively removing portions of said gap layer underlying said pair of laterally extending flanges to create a pair of re-entrant profiles in said gap layer.

17. The data transducer of claim 16 wherein said step of selectively removing portions of said gap layer comprises the step of:

etching said gap layer.

18. The data transducer of claim 16 wherein said step of selectively removing portions of said gap layer further comprises the step of:

terminating said step of selectively removing portions of said gap layer before said re-entrant profiles in said gap layer have a width equal to or smaller than that of said pair of laterally extending flanges.

19. The data transducer of claim 1 wherein said step of removing portions of said upper pole comprises the step of:

ion milling said upper pole, said laterally extending flanges and a predetermined portion of said upper surface of said lower pole element.

20. The data transducer of claim 19 wherein said step of ion milling comprises the step of:

ion milling from multiple angles.

21. The data transducer of claim 19 wherein said step of ion milling further comprises the step of:

terminating said step of ion milling after said pair of laterally extending flanges have been removed.

22. The data transducer of claim 21 wherein said step of terminating said step of ion milling further comprises the step of:

ceasing said step of ion milling when said lower pole is substantially equal in width to that of said upper pole.

* * * * *

UNITED STATES PATENT AND TRADEMARK OFFICE
CERTIFICATE OF CORRECTION

PATENT NO: 6,141,183

DATED: October 31, 2000

INVENTOR(S): Andrew L. Wu, Paul Duval and Thomas Ferraguto

It is certified that error appears in the above-identified patent and that said Letters Patent is hereby corrected as shown below:

[73] Assignee: Matsushita-Kotobuki Electronics Industries, Ltd., Saijo, Japan

Signed and Sealed this

Twenty-fourth Day of April, 2001

Attest:

NICHOLAS P. GODICI

Attesting Officer     Acting Director of the United States Patent and Trademark Office